(12) United States Patent
Hashimoto et al.

(10) Patent No.: US 7,192,671 B2
(45) Date of Patent: Mar. 20, 2007

(54) BATTERY HAVING NONCONDUCTIVE CORE

(75) Inventors: Tatsuya Hashimoto, Naga-gun (JP); Kenji Kimura, Sennan-gun (JP); Seiichi Uemoto, Izumi (JP); Hironori Yukisada, Hirakata (JP); Masatomo Nagatani, Naga-gun (JP); Takabumi Fujii, Suita (JP)

(73) Assignee: Matsushita Electrical Industrial Co., Ltd., Osaka (JP)

( * ) Notice: Subject to any disclaimer, the term of this patent is extended or adjusted under 35 U.S.C. 154(b) by 374 days.

(21) Appl. No.: 10/395,684

(22) Filed: Mar. 24, 2003

(65) Prior Publication Data

US 2003/0186113 A1    Oct. 2, 2003

(30) Foreign Application Priority Data

Mar. 29, 2002    (JP)    ............................. 2002-094222

(51) Int. Cl.
*H01M 6/10*    (2006.01)

(52) U.S. Cl. ................... 429/94; 429/211; 429/163; 429/178

(58) Field of Classification Search .................. 429/94, 429/163, 171, 174, 179, 181, 185, 186, 211, 429/176, 178

See application file for complete search history.

(56) References Cited

U.S. PATENT DOCUMENTS 5,914,201 A * 6/1999 Hughett et al. ............... 429/72

FOREIGN PATENT DOCUMENTS

| JP | 09-115500 | 5/1997 |
|----|-----------|--------|
| JP | 10-021952 | 1/1998 |
| JP | 10-261427 | 9/1998 |

* cited by examiner

*Primary Examiner*—Raymond Alejandro
(74) *Attorney, Agent, or Firm*—Jordan and Hamburg LLP

(57) ABSTRACT

In a battery having a structure that an electrode plate group, formed by winding a positive electrode plate and a negative electrode plate with a separator interposed therebetween, is housed in a battery case together with an electrolyte solution, the electrode plate group is rolled around a roll core, and both ends of the roll core are supported by the battery case.

7 Claims, 6 Drawing Sheets

BATTERY HAVING NONCONDUCTIVE CORE

The present disclosure relates to subject matter contained in priority Japanese Patent Application No. 2002-94222, filed on Mar. 29, 2002, the contents of which is herein expressly incorporated by reference in its entirety.

BACKGROUND OF THE INVENTION

1. Field of the Invention

The present invention relates to a battery, and more particularly, to a battery configured in such a manner that an electrode plate group, which is formed by winding a positive electrode plate and a negative electrode plate with a separator interposed therebetween, is housed in a battery case together with an electrolyte solution.

2. Description of Related Art

Electric vehicles and hybrid cars are raising expectations in recent years for solving global environmental issues, and rechargeable batteries, as their power sources, are eagerly anticipated to meet demands for higher capacity and higher output capabilities in addition to downsizing and weight-saving properties. As the rechargeable batteries which meet such demands, a lithium ion rechargeable battery, a nickel-metal hydride battery, and the like have been already put into practical use.

For example, Japanese Patent Laid-Open Publication No. Hei 10-261427 discloses a battery in which an electrode plate group, formed by winding a positive electrode plate and a negative electrode plate with a separator interposed therebetween, is housed in a battery case together with an electrolyte solution. The structure of a typical battery 30 will be described below with reference to FIG. 7. Here, an electrode plate group 32 formed by winding a positive electrode plate 34 and a negative electrode plate 35 with a separator 36 interposed therebetween is housed in a battery case 31 of a prismatic shape such that a core of the roll is aligned parallel to an opening of the battery case 31. Then the opening of the battery case 31 is hermetically sealed with a lid 37 including a negative terminal 38 and a safety vent 39. A core member of the positive electrode plate 34 at the outermost periphery of the electrode plate group 32 is exposed and connected to the battery case 31; meanwhile, an end portion of the negative electrode plate 35 is connected to the negative terminal 38 with a lead 40.

Meanwhile, Japanese Patent Laid-Open Publication No. Hei 9-115500 discloses a structure for attaching a connection terminal to a lid of a battery. The structure will be described with reference to FIG. 8. A connection terminal 51 includes a pole 52 penetrating a lid 50, and a flange 53 abutting on an inner side surface of the lid 50. A sealing member 54 such as an O-ring is placed between the flange 53 and an inner surface of the lid 50, and an annular push spring 55 engaged with an outer periphery of the pole 52 is pressed to contact with an outer surface of the lid 50 via a washer 56. Accordingly, the connection terminal 51 is fixed to the lid 50 by pressure from the annular push spring 55.

However, in the structure of the battery 30 shown in FIG. 7, large force acts on the electrode plate group 32 when vibration is applied to the battery 30. Accordingly, the low-strength electrode plate group 32 suffers damage such as falling of electrode mixtures originally applied to the positive electrode plate 34 or the negative electrode plate 35, whereby battery characteristics may be suddenly deteriorated. Such a problem is critical to any batteries other than a cylindrical battery that houses a roundly wound electrode plate group in a cylindrical battery case.

Moreover, in the structure for attaching a connection terminal shown in FIG. 8, a sealing performance of the sealing member 54 is deteriorated due to variation in the amount of compression of the sealing member 54 if a fitting angle of the pole 52 of the connection terminal 51 is not perpendicular to the inner side surface of the lid 50. Accordingly, a sealing performance of the battery is deteriorated and the battery life is shortened.

SUMMARY OF THE INVENTION

In light of the foregoing problems of the prior art, an object of the present invention is to provide a battery, which eliminates a risk of damaging an electrode plate group upon vibration or the like, exerting a high sealing performance, and achieving high reliability for a long period even in bad usage conditions.

According to an aspect of the present invention, a battery is configured in such a manner that an electrode plate group, which is formed by winding a positive electrode plate and a negative electrode plate with a separator interposed therebetween, is housed in a battery case together with an electrolyte solution. Here, the electrode plate group is wound around a roll core, and both ends of the roll core are supported by the battery case. Since the electrode plate group is supported by the battery case via the roll core, the battery does not bear a risk of damaging the electrode plate group upon vibration or the like, and thereby achieves high reliability for a long period even in bad usage conditions.

While novel features of the invention are set forth in the preceding, the invention, both as to organization and content, can be further understood and appreciated, along with other objects and features thereof, from the following detailed description and examples when taken in conjunction with the attached drawings.

DETAILED DESCRIPTION OF THE PREFERRED EMBODIMENTS

Figure 1:
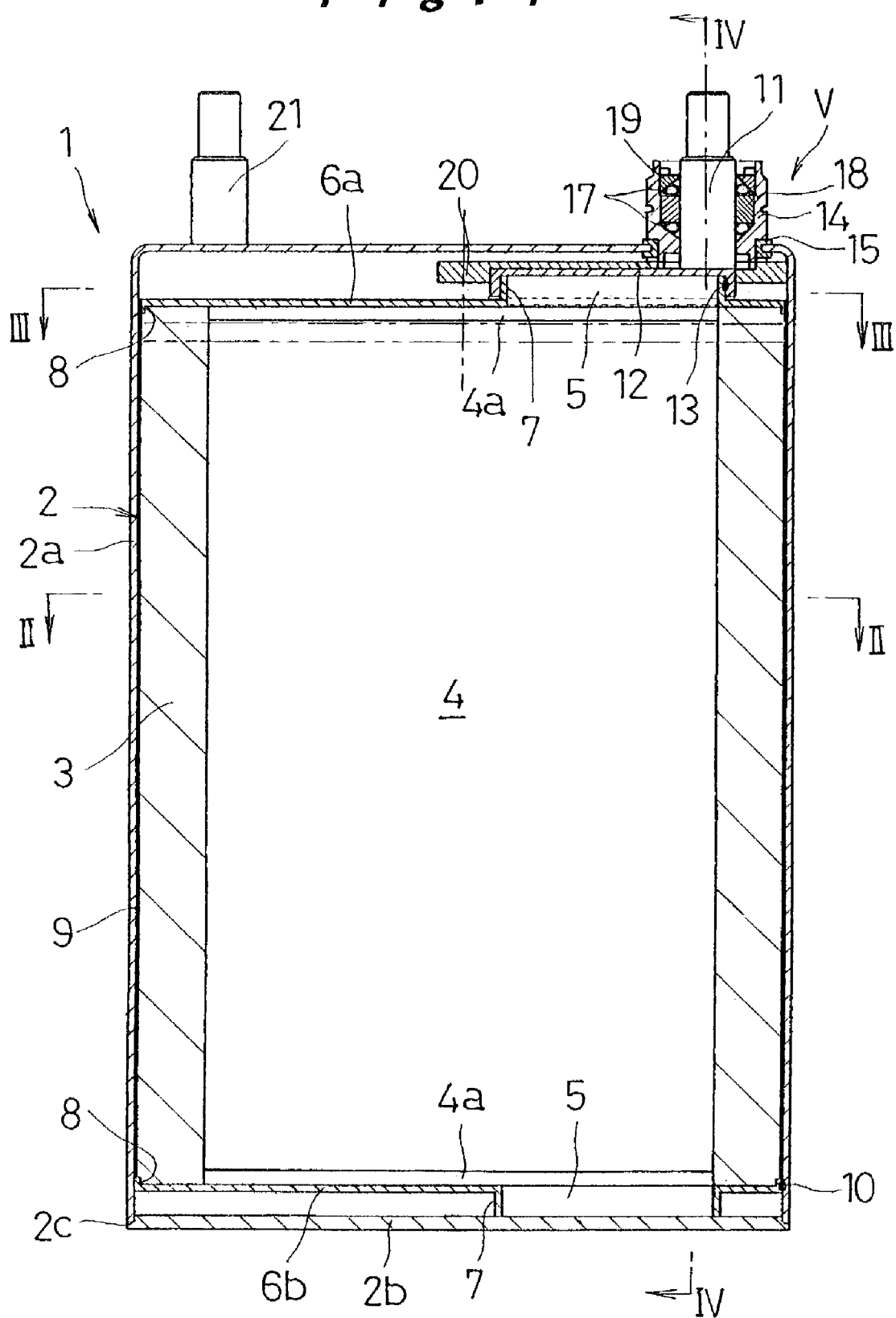
FIG. 1 is a longitudinal sectional front view of a battery according to one embodiment of the present invention.
Figure 2:
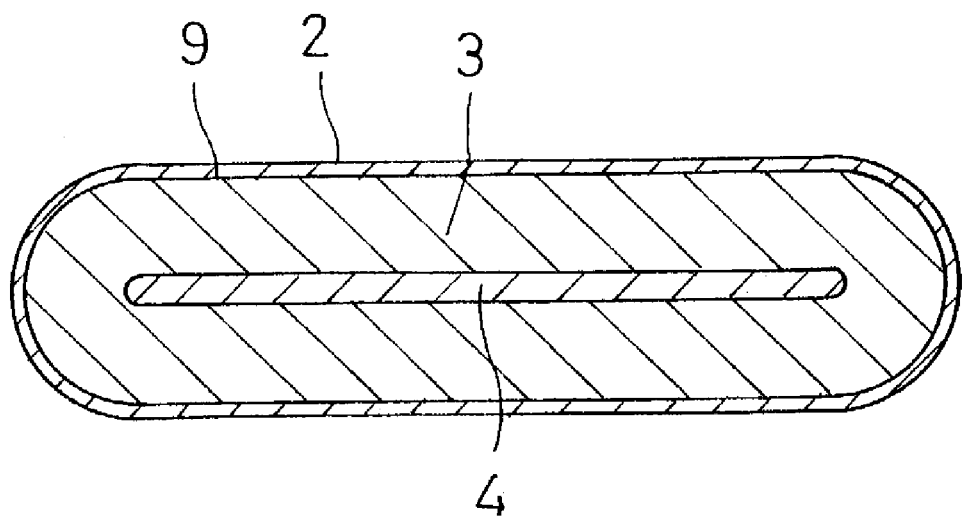
FIG. 2 is a cross-sectional view taken along the II—II line in FIG. 1.
Figure 3:
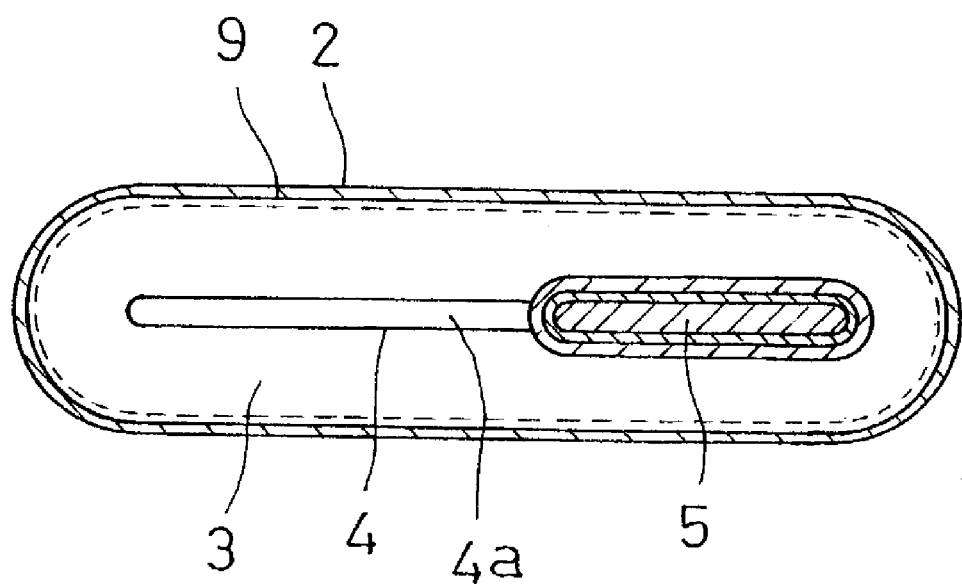
FIG. 3 is a cross-sectional view taken along the III—III line in FIG. 1.
Figure 4:
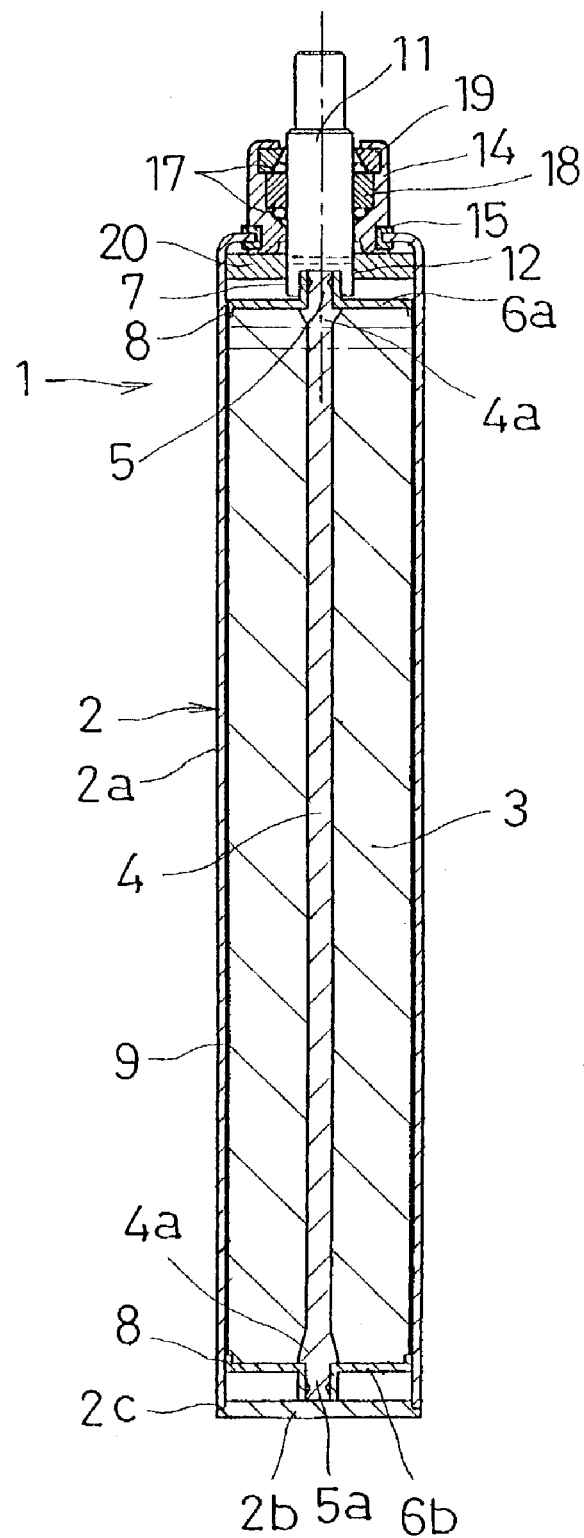
FIG. 4 is a cross-sectional view taken along the IV—IV line in FIG. 1.
Figure 5:
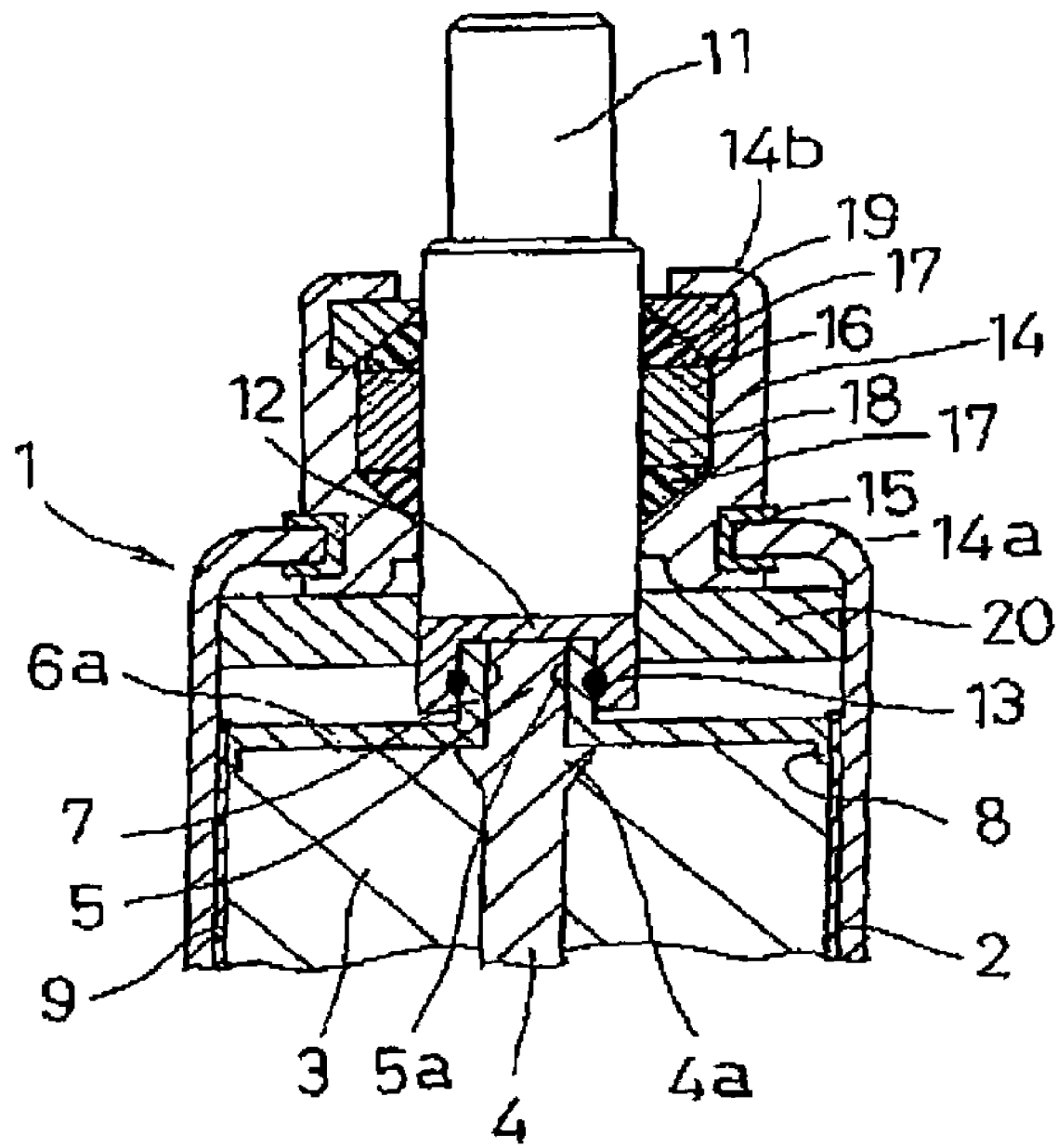
FIG. 5 is an enlarged cross-sectional view of the portion V in FIG. 1.

Now, a configuration of a battery according to one embodiment of the present invention will be described with reference to FIGS. 1 to 6.

In FIGS. 1 to 5, reference numeral 1 denotes a battery. The battery 1 is configured in such a manner that an electrode plate group 3, which is formed by winding a positive electrode plate and a negative electrode plate with a separator interposed therebetween, is housed in a battery case 2 together with an electrolyte solution. The battery case 2 includes a container 2a with an opening at a bottom end, and a lid plate 2b for closing the opening. The container 2a is formed into a flat block shape or an approximately prismatic shape with a transverse cross section of an oblong or a rounded rectangle. An outer periphery of the lid plate 2b is hermetically fixed to an edge of the opening of the container 2a at a welded part 2c.

The electrode plate group 3 is formed by winding the positive electrode plate and the negative electrode plate around a roll core 4 made of synthetic resin and having a flat plate shape such that a core member of the positive electrode plate is exposed at one end portion of the electrode plate group 3 and a core member of the negative electrode plate is exposed at the other end portion thereof. Both ends of the roll core 4 corresponding to the exposed core members of the respective electrode plates of the electrode plate group 3 are severally formed into enlarged portions 4a with triangular cross sections, and a connective protrusion 5 with an oblong cross section is provided at a side portion of each end surface of the roll core 4.

Current collectors 6a and 6b are disposed close to the both end surfaces of the electrode plate group 3 so as to abut on the exposed core members of the positive and negative electrode plates. The current collectors 6a and 6b are welded to the core members of the respective electrode plates at a plurality of points by laser beam welding, electron beam welding, or the like. In the illustrated example, the core member of the negative electrode plate is exposed at the upper end portion of the electrode plate group 3 so that the upper current collector 6a constitutes a negative current collector. Meanwhile, the core member of the positive electrode plate is exposed at the lower end portion of the electrode plate group 3 so that the lower current collector 6b constitutes a positive current collector.

Moreover, oblong tubes 7 are respectively provided on the current collectors 6a and 6b so as to be fitted to outer peripheries of the connective protrusions 5 that are provided at the both ends of the roll core 4. The current collectors 6a and 6b are fixed to the both ends of the roll core 4 by caulking these oblong tubes 7 against caulking recesses 5a (see FIG. 5) which are formed on the outer peripheries of the connective protrusions 5.

Further, shapes of outer peripheral edges of the current collectors 6a and 6b are formed into proper shapes so as to be fitted to the inner periphery of the battery case 2, and annular collars 8 protrude out of the outer peripheral edges while surrounding the outer peripheries at the end portions of the electrode plate group 3. Meanwhile, an outer periphery separator 9 is interposed between the outer peripheries of the upper negative current collector 6a as well as of the electrode plate group 3, and the inner periphery of the battery case 2 for the purpose of insulation. On the contrary, the outer periphery of the lower positive current collector 6b and the inner periphery of the battery case 2 contact each other and are welded together at a plurality of welded parts 10, whereby the positive current collector 6b and the battery case 2 are fixed and electrically connected to each other.

A connection cap 12, which is fixed to the lower end of the negative connection terminal 11, covers the upper end and the outer periphery of the oblong tube 7 of the negative current collector 6a, and a peripheral wall of the connection cap 12 and the tube 7 are joined together at welded parts 13. In this way, the cap 12 and the tube 7 are fixed and electrically connected to each other. Meanwhile, a lower end of a holder tube 14, which allows penetration of the negative connection terminal 11 for retention, is fitted and fixed to one side part of an upper end wall of the battery case 2 through an insulator 15 by caulking. Reference numeral 14a denotes such a caulking portion.

A tubular space 16 is defined between an inner periphery of the holder tube 14 and the outer periphery of the connection terminal 11. A pair of O-rings 17 and a tubular spacer 18 of synthetic resin to be interposed therebetween are disposed in this tubular space 16. A pressure ring 19 is disposed and fixed thereon by a caulking portion 14b.

Reference numeral 20 denotes a detent plate for supporting the connection terminal 11 by the battery case 2 against torque to be applied upon connection setting. The detent plate 20 includes a through hole for allowing penetration of the connection terminal 11, and a concave portion to be provided on a lower surface so as to allow insertion and engagement of the connection cap 12. Moreover, the detent plate 20 is formed such that an outer periphery thereof is tightly engaged with the inner surface of the battery case 2. Reference numeral 21 denotes a positive connection terminal which is fixed to the other side part of the upper end wall of the battery case 2.

According to the battery 1 having the above-described configuration, the electrode plate group 3 is wound around the roll core 4; one end of the roll core 4 is joined to the battery case 2 through the oblong tube 7 of the current collector 6a, the connection terminal 11, the tubular spacer 18, and the holder tube 14; the other end of the roll core 4 is joined to the battery case 2 through the current collector 6b. Thereby, the electrode plate group 3 is supported by the battery case 2 through the roll core 4. For this reason, the battery 1 does not bear the risk of damaging the electrode plate group 3 upon vibration or the like, and thereby achieves high reliability for a long period even in bad usage conditions. Particularly, in this embodiment, the electrode plate group 3 is wound around the roll core 4 of a flat plate shape; meanwhile, the battery case 2 has the transverse cross section of either an oblong or a rounded rectangle. The electrode plate group 3 is susceptible to damage because the distance between the battery case 2 and the electrode plate group 3 is not constant as compared to a cylindrical battery. Nevertheless, the electrode plate group 3 is protected against damage because the electrode plate group 3 is supported by the roll core 4.

Moreover, the current collectors 6a and 6b are welded to the exposed core members of the respective electrode plates at the both end portions of the electrode plate group 3 so as to fix the current collectors 6a and 6b, and the both ends of the roll core 4, respectively. Thereby, the both end portions of the electrode plate group 3 are fixed to the roll core 4 through the current collectors 6a and 6b. As a result, the electrode plate group 3 becomes even less susceptible to damage, and electrical pathways among the respective regions of the electrode plates and the current collectors 6a and 6b are shortened. Eventually, the battery 1 improves its performances by reducing internal resistance thereof.

Furthermore, the current collectors 6a and 6b are respectively formed into proper shapes so as to be fitted to the inner periphery of the battery case 2, and the annular collars 8 protrude out of the outer peripheral edges of the current collectors 6a and 6b while surrounding the end portions of the electrode plate group 3. Thereby, rigidity of the current collectors 6a and 6b is improved, and the outer peripheries of the current collectors 6a and 6b are supported by the battery case 2. As a result, the electrode plate group 3 becomes even less susceptible to damage. Meanwhile, the battery 1 eliminates a risk of damaging the outer peripheral edges at the end portions of the electrode plate group 3 when inserting the electrode plate group 3 into the battery case 2. Eventually, the battery 1 achieves enhanced workability upon assembly.

Moreover, the annular collar 8 in the outer periphery of the positive current collector 6b is welded to the battery case 2 at the plurality of welded parts 10, and the oblong tube 7 of the negative current collector 6a is welded to the peripheral wall of the connection cap 12 attached to the connection terminal 11 at the plurality of welded parts 13. Accordingly, the battery 1 improves the performances by reducing the internal resistance.

Furthermore, the battery case 2 is provided with the holder tube 14 for allowing the connection terminal 11 to penetrate and protrude outward, and the pair of O-rings 17 and the tubular spacer 18 therebetween are disposed in the space defined by the inner periphery of the holder tube 14 and the outer periphery of the connection terminal 11. The tubular spacer 18 prevents occurrence of deviation or variation in the size of a gap between the outer periphery of the connection terminal 11 and the inner periphery of the holder tube 14. Further, the O-rings 17 provided on both sides of the tubular spacer 18 are evenly compressed, whereby the O-rings 17 fully deliver dual sealing performances. As a result, the battery 1 secures high reliability of the sealing performances.

Therefore, the battery 1 of this embodiment does not bear the risk of damaging the electrode plate group 3 upon vibration or the like, and thereby achieves high reliability for a long period even in bad usage conditions.

Figure 6:
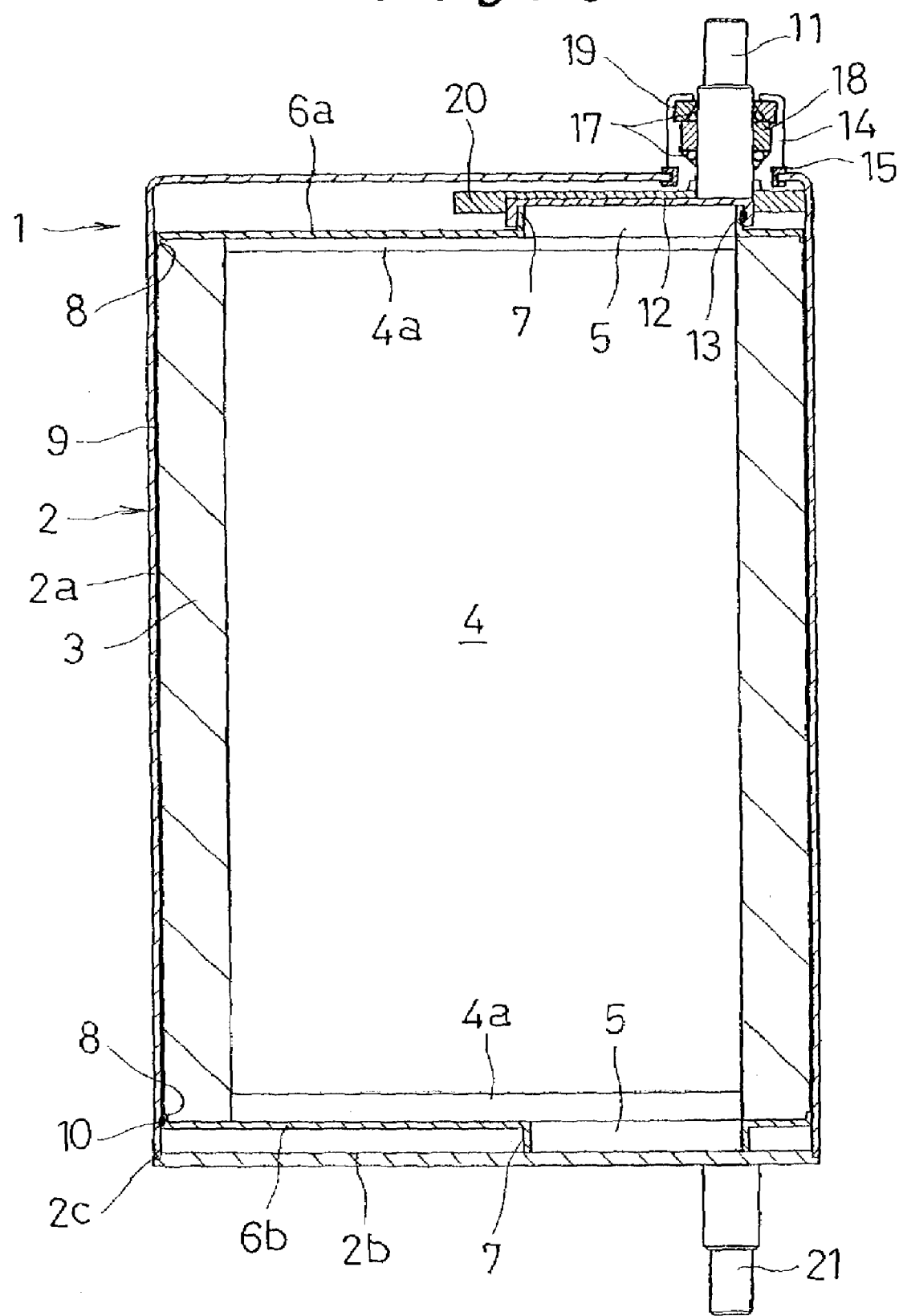
FIG. 6 is a longitudinal sectional front view of a battery according to another embodiment of the invention.
Figure 7:
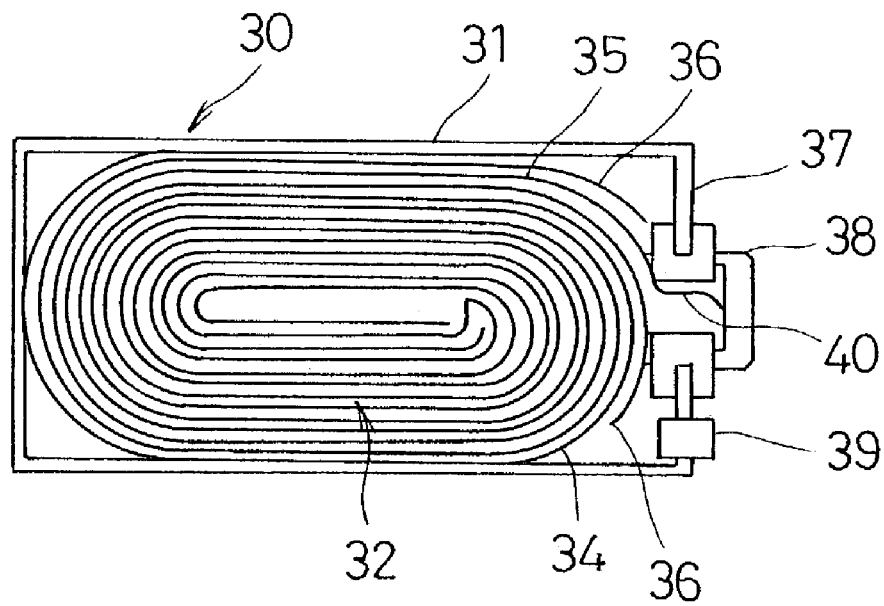
FIG. 7 is a longitudinal sectional front view of a conventional battery.
Figure 8:
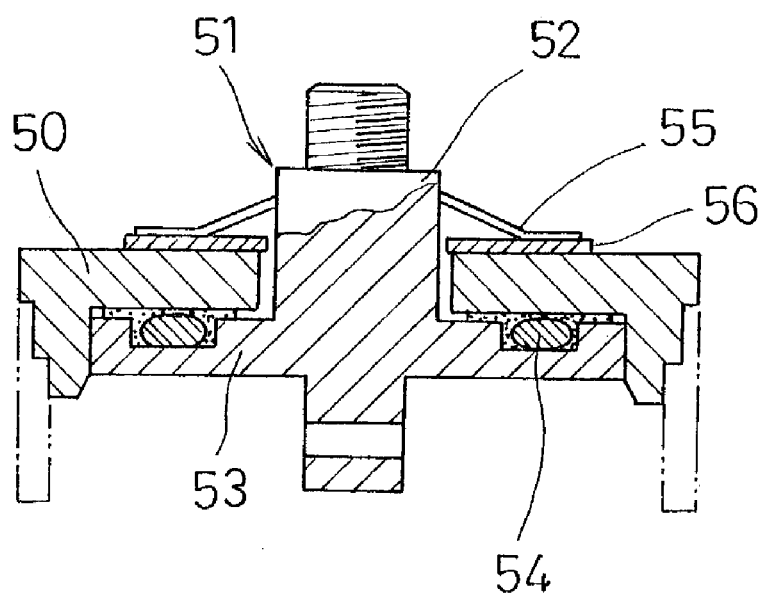
FIG. 8 is a longitudinal sectional front view of a connection terminal portion of another conventional battery.

Although the above-described embodiment shows the example in which the positive connection terminal 21 is fixed to the other side part on the upper end surface of the container 2a of the battery case 2, and, the negative and positive connection terminals 11 and 21 are thereby arranged at the both side parts on the upper end surface of the battery case 2. However, as shown in FIG. 6, the battery of the present invention can have the configuration, in which the positive connection terminal 21 is fixed on the lid plate 2b of the battery case 2 at the same side part as the side where the negative connection terminal 11 is located on the container 2a such that the negative and positive connection terminals 11 and 21 protrude out of both longitudinal end portions at one side part of the battery case 2.

Although the above-described embodiment shows the example in which the holder tube 14 is fixed to the battery case 2 by caulking, the holder tube 14 can be fixed by welding instead. Additionally, the cross section of the pressure ring 19 is not limited to the approximately triangular shape as shown in the drawing, but the pressure ring 19 can have a cross section of a quadrangular shape instead.

As it has been described above, the battery of the present invention supports the electrode plate group by the battery case through the roll coil. Thus, the battery does not bear the risk of damaging the electrode plate group upon vibration or the like, and thereby achieves high reliability for a long period even in bad usage conditions.

Although the present invention has been fully described in connection with the preferred embodiment thereof, it is to be noted that various changes and modifications apparent to those skilled in the art are to be understood as included within the scope of the present invention as defined by the appended claims unless they depart therefrom.

What is claimed is:

1. A battery comprising:
    a battery case including battery case opposing end regions and storing an electrolyte solution, one of said opposing end regions including a terminal connector having a connection cap and the other of said opposing end regions including bottom lid for said battery case;
    first and second current collectors which are fixedly disposed at said respective ones of said battery case opposing end regions so that one of said current collectors is structurally fixed to said connection cap of said terminal connector and the other of said current collectors is structurally fixed to said bottom lid of said battery case;
    a nonconductive roll core exterior surface and including roll core opposing ends which are structurally fixed to respective ones of said first and second current collectors and structurally fixed to ones of said connection cap of said terminal connector and said bottom lid of said case;
    an electrode plate group including plate group opposing end portions and comprising a positive plate, a negative plate and a separator disposed therebetween;
    an exposed edge of said positive plate and an exposed edge of said negative plate respectively extending from ones of said plate group opposing end portions; and
    said electrode plate group being wound around said roll core so that:
       said roll core opposing ends extend beyond respective ones of said plate group opposing end portions; and
       each of said edges of said positive and negative plate groups fixedly abut and electrically connect with respective ones of said current collectors.

2. The battery according to claim 1, wherein
the roll core is formed into a flat plate shape, and
a transverse cross section of the battery case is any of an oblong and a rounded rectangle.

3. The battery according to claim 1, wherein
an outer peripheral edge of the current collector is formed into a shape to be engaged with an inner periphery of the battery case, and
an annular collar is formed to protrude our of the outer peripheral edge while surrounding the end portions of the electrode place group.

4. The battery according to claim 1, wherein
the current collectors are welded to any of the battery case and a connection terminal being fixed to the battery case.

5. The battery according to claim 1, wherein
a connection terminal is welded to at least one of the current collectors,
the battery case includes a holder rube for allowing the connection terminal to penetrate therethrough and protrude outward,
a pair of sealing members are provided between an outer periphery of the connection terminal and an inner periphery of the holder tube, and
a spacer is provided between the sealing members.

6. A battery comprising:
    a battery case including battery case opposing end regions and storing an electrolyte solution, one of said opposing end regions including a terminal connector having a connection cap and the other of said opposing end regions including bottom lid for said batten case;
    first and second current collectors which are fixedly disposed at respective ones of said battery case opposing end regions so that one of said current collectors is structurally fixed to said connection can of said terminal connector and the other of said current collectors is structurally fixed to said bottom lid of said battery case;

a nonconductive roll core and including roll core opposing ends which are in structurally fixed to respective ones of said first and second current collectors and structurally fixed to ones of said connection can of said terminal connector and said bottom lid of said case;

an electrode plate group including plate group opposing end portions and comprising a positive plate, a negative plate and a separator disposed therebetween;

an exposed edge of said positive plate and an exposed edge of said negative plate respectively extending from ones of said plate group opposing end portions; and said electrode plate group being wound around said roll core so that:
   said roll core opposing ends extend beyond respective ones of said plate group opposing end portions; and
   each of said edges of said positive and negative plate groups fixedly abut and electrically connect with respective ones of said current collectors.

7. The battery of claim 6 wherein said core opposing ends are fixed to respective ones of said case opposing ends.

* * * * *